March 8, 1938.          F. D. CHURA          2,110,588
SPOOL HOLDER
Filed March 5, 1937
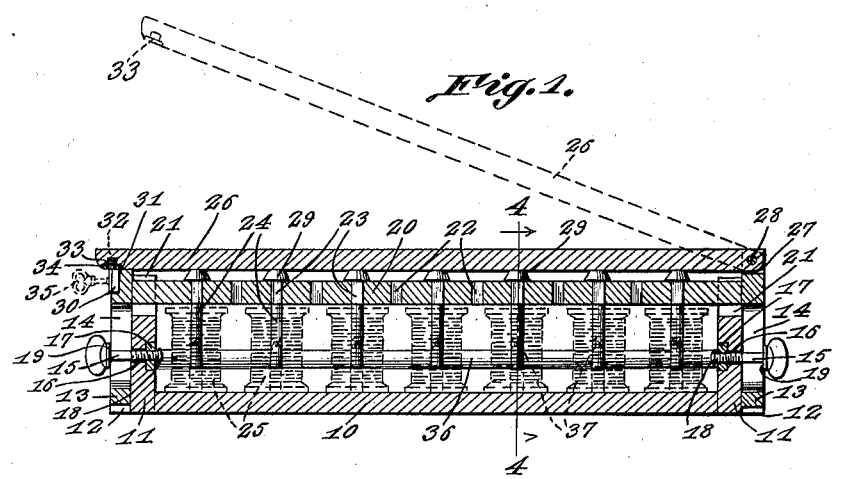
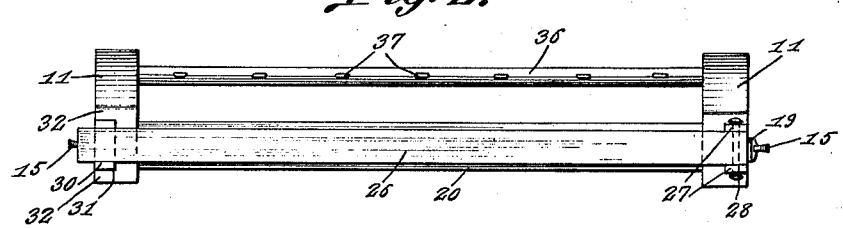
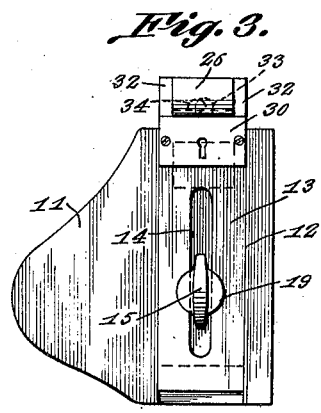 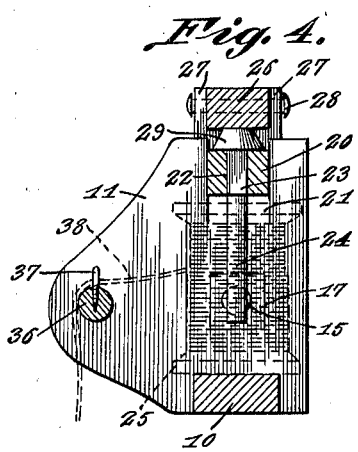
Fred D. Chura, INVENTOR
BY Victor J. Evans & Co.
ATTORNEYS Patented Mar. 8, 1938

2,110,588

UNITED STATES PATENT OFFICE 2,110,588

SPOOL HOLDER

Fred D. Chura, Orange, N. J.

Application March 5, 1937, Serial No. 129,280

1 Claim. (Cl. 242—140)

This invention relates to spool holders of the general type described in my co-pending application entitled Spool holders, filed November 5, 1935, Serial No. 48,375.

An object of the invention is to provide a spool holder which will be adjustable vertically so as to permit the mounting of various sizes of spools on the spool spindles.

A further object is to provide a spool holder having a spindle carrying bar and a hinged locking bar assembled with the carrying bar as a unit and adapted to be locked in position to prevent the spindles being withdrawn during a surreptitious attempt to steal the thread and to prevent wobbling of the spindles.

A further object is to provide a device of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a longitudinal sectional view through a spool holder constructed in accordance with the invention.

Figure 2 is a plan view of the spool holder shown in Figure 1.

Figure 3 is an end elevation of the spool holder looking in the direction of the lock.

Figure 4 is a vertical section taken on the line 4—4 of Figure 1.

Referring now to the drawing in which like characters of reference designate similar parts in the various views, the spool holder is shown to comprise a base bar 10 which is adapted to be mounted in any preferred manner on a sewing machine and is provided at the opposite ends with upright heads 11 of the general shape shown in Figures 3 and 4. Each head is provided in the outer face with a vertically disposed guide groove 12 adapted to slidably receive a bar 13 having a slot 14 therein. A wing screw 15 is passed through the slot and into an opening 16 in the respective head 11. The opening is enlarged to non-rotatably receive a nut 17 through which the screw is threadedly engaged and then headed up as shown at 18 at the end.

The wing screws 15 may be loosened to permit the slide bars 13 to be slid upwardly until the bottom walls of the slots 14 engage the wing screws, for the purpose of adjusting the device to receive spools of various heights as will presently appear. When the wing screws are tightened shoulders 19 on the screws clamp the slide bars 13 tightly in adjusted position against the heads 11.

A bar 20 is fixed at both ends to the upper ends of the vertical slide bars 13 and extends parallel with the base bar 10. The bar 20 projects through guide slots 21 in the heads 11 which slots permit of vertical adjustment of the bar 20. The bar 20 is provided at intervals with openings 22 of substantially rectangular or other cross section. These openings receive the squared necks 23 of pins 24 which are adapted to enter the axial openings in spools 25 of thread and rotatably mount the spools while the spools are supported upon the base bar 10. During vertical adjustment of the bar 20 the pins are moved upwardly as a unit therewith to permit various heights of spools being inserted on the pins.

A guard bar 26 is inserted between hinge ears 27 on one of the heads 11 and a hinge pintle 28 is passed through the ears and through the bar to hingedly mount the bar at one end on said head. The bar extends longitudinally in superposed position along the pin carrying bar 20 and presses directly upon the heads 29 of the pins 24 to prevent tampering of the pins in a surreptitious attempt to steal the spools of thread, and to prevent wobbling of the spindles in the bar 20.

A conventional lock 30 is mounted on the other head 11 and preferably is countersunk in a recess 31, best shown in Figures 1 and 2. Above the recess the head is provided with upstanding guide lugs 32 which receive the free end of the guard bar 26. The bar 26 is provided in the end with a keeper 33 into which the lock bolt 34 may be sunk laterally to hook down the keeper as best shown in Figure 3 and prevent the guard bar 26 from being opened except by an authorized person in charge of the key 35 of the lock.

A rod 36 is secured at the ends in both heads 11 and is provided with a plurality of upstanding screw eyes 37 through which the thread 38 from the spools may be trained as best shown in Figure 4.

It will be pointed out that when the guard bar 26 is unlocked and rocked open to the dotted line position shown in Figure 1 selected ones of the pins 24 may be removed to replace empty spools when necessary. It will also be pointed out that the pins 24, the pin carrying bar 20, and the guard bar 26, are all movable vertically as a unit when the wing screws 15 are adjusted to permit various widths of spools being received in the spool holder. Also it will be pointed out that the large number of openings 22 permit a wide range of selecting the proper openings to mount spools of various lengths and circumference.

From the above description it is thought that the construction and operation of the invention is fully understood without further explanation.

What is claimed is:

A spool holder including a base bar, heads on the ends of the base bar provided with guide grooves, slide bars in the guide grooves movable toward and away from the base bar and substantially perpendicular to the base bar, means for holding said slide bars in adjusted positions in the grooves, a spindle carrying bar secured at the ends to the slide bars and movable as a unit with the slide bars, spindles projecting from the spindle carrying bar toward the base bar and adapted to rotatably mount spools when the spools are supported upon the base bar, and a locking bar hinged at one end to one of said slide bars and extending longitudinally of the spindle carrying bar adjacent to the spindles for preventing surreptitious removal of the spindles.

FRED D. CHURA.